US 6,625,591 B1

(12) United States Patent
Vahalia et al.

(10) Patent No.: US 6,625,591 B1
(45) Date of Patent: Sep. 23, 2003

(54) VERY EFFICIENT IN-MEMORY REPRESENTATION OF LARGE FILE SYSTEM DIRECTORIES

(75) Inventors: Uresh Vahalia, Waban, MA (US); Sudhir Srinivasan, Chalmsford, MA (US)

(73) Assignee: EMC Corporation, Hopkinton, MA (US)

( * ) Notice: Subject to any disclaimer, the term of this patent is extended or adjusted under 35 U.S.C. 154(b) by 386 days.

(21) Appl. No.: 09/675,485

(22) Filed: Sep. 29, 2000

(51) Int. Cl.$^7$ ............... G06F 17/30; G06F 7/00; G06F 12/00; G06F 12/02; G06F 9/34
(52) U.S. Cl. ............... 707/1; 707/3; 707/10; 711/216; 711/221
(58) Field of Search ............... 707/1, 3, 10, 103, 707/203; 709/219, 234; 711/158, 202, 216, 221, 206

(56) References Cited

U.S. PATENT DOCUMENTS

| | | | | |
|---|---|---|---|---|
| 5,151,989 A | * | 9/1992 | Johnson et al. | 707/10 |
| 5,175,837 A | | 12/1992 | Arnold et al. | 395/425 |
| 5,175,852 A | | 12/1992 | Johnson et al. | 395/600 |
| 5,206,939 A | | 4/1993 | Yanai et al. | 395/400 |
| 5,218,695 A | | 6/1993 | Noveck et al. | 395/600 |
| 5,301,286 A | | 4/1994 | Rajani | 395/400 |
| 5,381,539 A | | 1/1995 | Yanai et al. | 395/425 |
| 5,390,318 A | * | 2/1995 | Ramakrishnan et al. | 711/158 |
| 5,590,320 A | * | 12/1996 | Maxey | 707/203 |
| 5,594,863 A | | 1/1997 | Stiles | 395/182.13 |
| 5,701,516 A | | 12/1997 | Cheng et al. | 395/842 |
| 5,737,747 A | | 4/1998 | Vishlitzky et al. | 711/118 |
| 5,835,953 A | | 11/1998 | Ohran | 711/162 |
| 5,893,086 A | * | 4/1999 | Schmuck et al. | 707/1 |
| 5,893,140 A | | 4/1999 | Vahalia et al. | 711/118 |
| 5,948,062 A | * | 9/1999 | Tzelnic et al. | 709/219 |
| 6,128,623 A | * | 10/2000 | Mattis et al. | 707/103 R |
| 6,292,795 B1 | * | 9/2001 | Peters et al. | 707/3 |
| 6,470,442 B1 | * | 10/2002 | Arimilli et al. | 712/32 |

OTHER PUBLICATIONS

David H.C. Du and Sheau–Ru Tong (1991), Multilevel Extendible Hashing: A File Structure for Very Large Database, pp. 357–370.*

Steere et al., "Efficient User–Level File Cache Management on the Sun Vnode Interface," USENIX Summer Conference, Jun. 11–15, 1990, Anaheim, California, pp. 325–331.

Uresh Vahalia, *UNIX Internals: The new frontiers*, Chapter 9, "File System Implementations," Prentice–Hall, Inc., Upper Saddle River, New Jersey, 1996, pp. 261–289.

Peter Norton and Richard Wilton, *The New Peter Norton Programmer's Guide to The IBM PC & PS/2*, Microsoft Press, Redmond, Washington, 1988, Chapter 5, Disk Basics, pp. 99–123.

(List continued on next page.)

*Primary Examiner*—Safet Metjahic
*Assistant Examiner*—Merilyn Nguyen
(74) *Attorney, Agent, or Firm*—Howrey Simon Arnold & White LLP

(57) ABSTRACT

To accelerate searching of large file system directories, hashing information for a selected directory is compiled and retained in random access memory prior to a need for access to the directory to satisfy a file access request from an application. No change in the on-disk file system representation is required, nor is there any need for nonvolatile storage of the hashing information. If memory is scarce, the hashing information can be incomplete yet give hints for searching the most-recently-accessed directory entries. In a preferred implementation, the hashing information for a directory includes a hash table for searching for names of objects such as files, subdirectories or links in the directory, and a hash table for searching for free space in the directory.

27 Claims, 12 Drawing Sheets

OTHER PUBLICATIONS

Sun Microsystems, Inc., "NFS: Network File System Protocol Specification," Network Working Group, http://www.attrition.org/~modify/texts/rfc1094.txt, Mar. 1989, 23 pages printed on Nov. 1, 2000.

Henry M. Levy and Richard H. Eckhouse, Jr., *Computer Programming and Architecture, The VAX–11*, Digital Equipment Corporation, Bedford, Mass., 1980, pp. 351–368

*Encyclopedia of Computer Science*, Third Edition, International Thomson Computer Press, London UK and Boston, MA, 1995, pp. 235, 553–555, 1185–1191, 1249–1263.

Brian W. Kernighan & Rob Pike, "The UNIX Programming Environment," Bell Telephone Laboratories, Inc., Murray Hill, NJ, 1984, pp. 41–70, 122–124.

\* cited by examiner

VERY EFFICIENT IN-MEMORY REPRESENTATION OF LARGE FILE SYSTEM DIRECTORIES

BACKGROUND OF THE INVENTION

1. Field of the Invention

The present invention relates generally to data storage, and more particularly to accessing file systems in data storage. Specifically, the present invention relates to searching a file system directory.

2. Background Art

Files are typically stored on disk in a hierarchical data structure called a file system. The file system includes a root directory and objects such as files, links, and subdirectories. The hierarchical arrangement was popularized in the UNIX operating system, and was also adopted in the Microsoft MS-DOS operating system for personal computers. The hierarchical arrangement survives today in various UNIX-based file systems, the Microsoft Windows operating system, and many other operating systems. Popular UNIX-based file systems are the UNIX file system (ufs), which is a version of Berkeley Fast File System (FFS) integrated with a vnode/vfs structure, and the System V file system (s5fs). The implementation of the ufs and s5fs file systems is described in Chapter 9, pp. 261–289 of Uresh Vahalia, *Unix Internals:* The New Frontiers, 1996, Prentice Hall, Inc., Simon & Schuster, Upper Valley River, N.J. 07458. The implementation of the MS-DOS file system is described in Chapter 5, pp. 99–123 of Peter Norton & Richard Wilton, *The New Peter Norton Programmer's Guide to The IBM PC & PS/2*, 1988, Microsoft Press, Redmond, Wash. 98073.

A file is normally accessed by a command that specifies a file name. At least the directory or subdirectory containing the file must be searched to find the directory entry containing the specified file name. This directory entry includes information pointing to the location where the file data are stored on disk. The search of the directory entries for the specified file name is a scanning process that suffers from a linear growth in access time as a function of the size of the directory.

The explosive growth of the Internet has led to a great demand for very large information repositories; for example, Internet service providers (ISPs) need to store e-mail for several hundreds of thousands of customers. Especially in the Internet domain, there is often a need to store information in large, flat directories. Invariably, high-speed access to these files is crucial, often dictating the survival of such businesses.

By way of example, consider a typical e-mail provider business. One way to organize the e-mail storage is by user name. The user names can be partitioned across several file systems akin to the way an encyclopedia is split into several alphabetically sorted volumes, In this case, the number of user directories in a file system is clearly not bounded and can change dynamically. Typically the number of user directories will grow, but it may fluctuate and will shrink if the e-mail provider becomes unsuccessful. Based on the distribution of names chosen by users, some file systems could very well have 100s of thousands of entries.

The conventional technique for accessing a directory in a traditional file system was not designed for such large directories. The conventional technique results in very long response times when dealing with large directories. Further, the response time tends to be a function of the size of the directory itself—typically, the response time grows in linear proportion to the size of the directory. This is clearly unacceptable in the example of an e-mail service provider. Instead, it is desired to have approximately constant-time access to the contents of such directories

SUMMARY OF THE INVENTION

In accordance with a basic aspect of the invention, a digital computing system has random access memory and data storage. An operating system program is executed to manage at least one file system in the data storage. The file system includes at least one directory. The invention provides a computer-implemented method, which includes accessing the directory and compiling and storing in the random access memory hashing information for searching the directory. The method further includes, when a need arises for searching the directory, accessing the hashing information in the random access memory and using the hashing information for searching the directory.

In accordance with another aspect of the invention, a digital computing system has random access memory and data storage. An operating system program is executed to manage at least one file system in the data storage. The file system includes at least one directory of files in the data storage. An application program is also executed to access at least one file in the directory of files. The invention provides a computer-implemented method of accelerating a search of the directory of files for access of the application program to a specified file in the directory. Prior to a need for access to the directory to satisfy a file access request from the application program, the directory is accessed, and hashing information is compiled and stored in the random access memory for searching the directory to satisfy the file access request. When the need arises for access to the directory to satisfy the file access request from the application program, the hashing information is used for searching the directory to satisfy the file access request.

In accordance with another aspect, a digital computing system has random access memory and data storage. An operating system program is executed to manage at least one file system in the data storage. The data storage contains a plurality of directories, including at least one directory in the file system. The directories include a group of directories for which an accelerated search is desirable, and a group of directories for which an accelerated search is not desirable. The invention provides a computer-implemented method of accelerating a search of a specified directory in the file system. The data storage is accessed to find the group of directories for which an accelerated directory search is desirable, and accesses each directory in the group of directories for which an accelerated search is desirable and compiles and stores in the random access memory respective hashing information for searching each directory in the group of directories for which an accelerated search is desirable. When a need arises for searching a specified directory, the method further includes determining whether the specified directory has in the random access memory respective hashing information for searching the specified directory, and when it is determined that the specified directory has in the random access memory respective hashing information for searching the specified directory, using the respective hashing information for searching the specified directory.

In accordance with yet another aspect, the invention provides a program storage device containing a program for execution by a digital computing system having random access memory and data storage, and in which an operating system program is executed to manage at least one file system in the data storage. The file system includes at least one directory of files. The program is executable for compiling and storing in the random access memory hashing information for searching the directory. When a need arises for searching the directory, the program is executable for using the hashing information in the random access memory for searching the directory.

Figure 1:
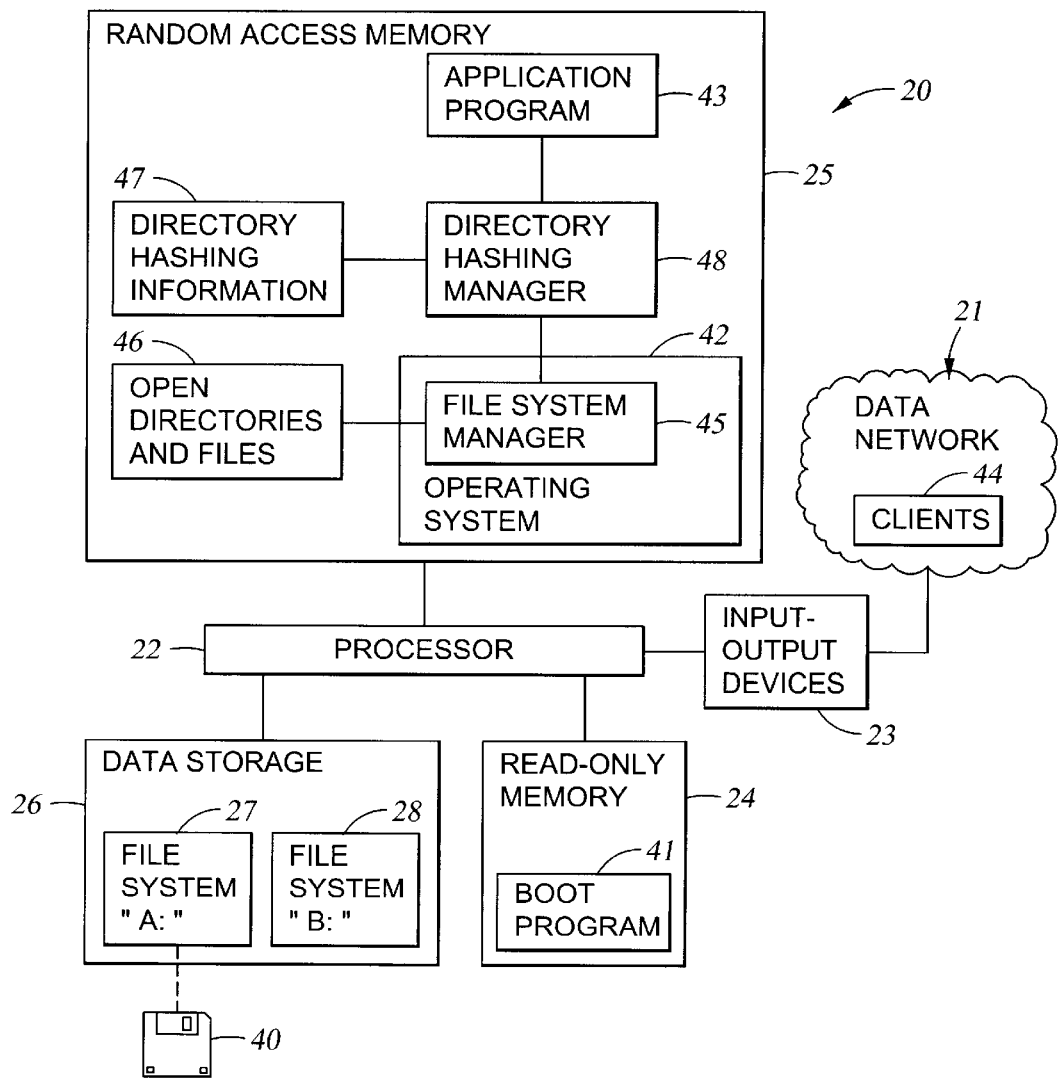
FIG. 1 is a block diagram of a digital computer using directory hashing information resident in random access memory in accordance with the present invention.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

FIG. 1 shows a block diagram of a digital computer such as a server generally designated 20 for a data network 21. The server 20 includes a processor 22, input-output devices 23 linking the processor to the data network 21, a read-only memory 24, a random access memory 25, and data storage 26. The random access memory 25 includes a number of dynamic random access memory (DRAM) semiconductor integrated circuits. The data storage 26, for example, includes one or more disk drives. The preferred construction for the data storage 26, for example, is a cached disk data storage system. The use of a cached disk data storage subsystem in a network file server is further described in Vahalia et al., U.S. Pat. No. 5,893,140, issued Apr. 6, 1999, and entitled "File Server Having A File System Cache And Protocol For Truly Safe Asynchronous Writes," incorporated herein by reference. The data storage 26 contains one or more file systems, such as a file system "A:" 27, and a file system "B:" 28.

Figure 2:
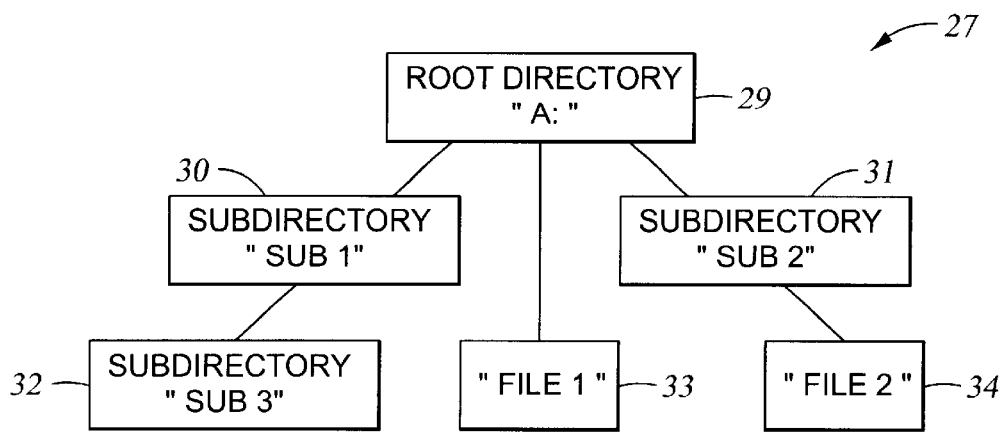
FIG. 2 shows a block diagram of a file system having a hierarchical organization.

Each of the file systems 27, 28 is a set of files arranged in a hierarchy. As shown in FIG. 2, for example, the file system "A:" includes a root directory 29, subdirectories 30, 31, 32, and files 33, 34 which are not directories. Each directory may include one or more subdirectories and one or more files. For example, the root directory 29 contains the two subdirectories 30, 31 and the file 33. The subdirectory 30 contains the subdirectory 32, and the subdirectory 31 contains the file 34.

Returning to FIG. 1, when the digital computer 20 in FIG. 1 is reset or first powered on, the processor 22 begins executing a boot program 41 in the read-only memory 24. The boot program 41 instructs the processor 22 to look for a special file in the root directory of the file system "A:" This special file, for example, is known as an "autoexec" program. In this example, the autoexec program is part of the operating system 42. When the processor finds the autoexec program, the boot program instructs the processor to load the autoexec program into the random access memory 25, and to begin executing the autoexec program. The operating system creates an environment for execution of application programs in a multi-tasking environment. Then the operating system looks in a startup file for links to application programs that should be loaded into RAM and executed.

As shown in FIG. 1, an application program 43 has been loaded into the random access memory 25. For example, the directory hashing manager program 48 and the application program 43 are contained in a program storage device 40 such as a floppy disc containing the file system "A:", and these programs are loaded into the random access memory 25 from the floppy disk. In this example, the application program services requests from network clients 44 for access to respective user files in the file system "B:" 28 in the data storage 26. These files, for example, are e-mail boxes for the respective clients.

To manage the files in the file systems 27, 28, the operating system 42 includes a program called a file system manager 45. The file system manager, for example, responds to requests from the application program 43 to open specified directories and files, and to load certain information of the open directories and files from the data storage 26 to an allocated region 46 of the random access memory.

The present invention deals with a problem that results when the file manager 45 as searches a directory for the name of a specified object. Conventional file system managers 45 are constructed so as to operate efficiently when there are not a very large number of files in any directory. The programmer is expected to avoid directories having a large number of files by grouping the files in some logical fashion, creating a subdirectory for each group, and transferring the files of each group to its subdirectory. Unfortunately, a programmer cannot always anticipate how an application program will be used. It is an annoyance to customize the directory structure for various users, and troublesome to change the directory structure in an installed program and databases including backup versions.

The present invention solves problems associated with large directories by providing directory hashing information 47 that is compiled and stored in the random access memory 25. This directory hashing information is maintained by a directory hashing manager program 48 that acts as an intermediary between the application program 43 and the file system manager 45, or is integrated into the application program, the file system manager, or the operating system 42.

Figure 3:
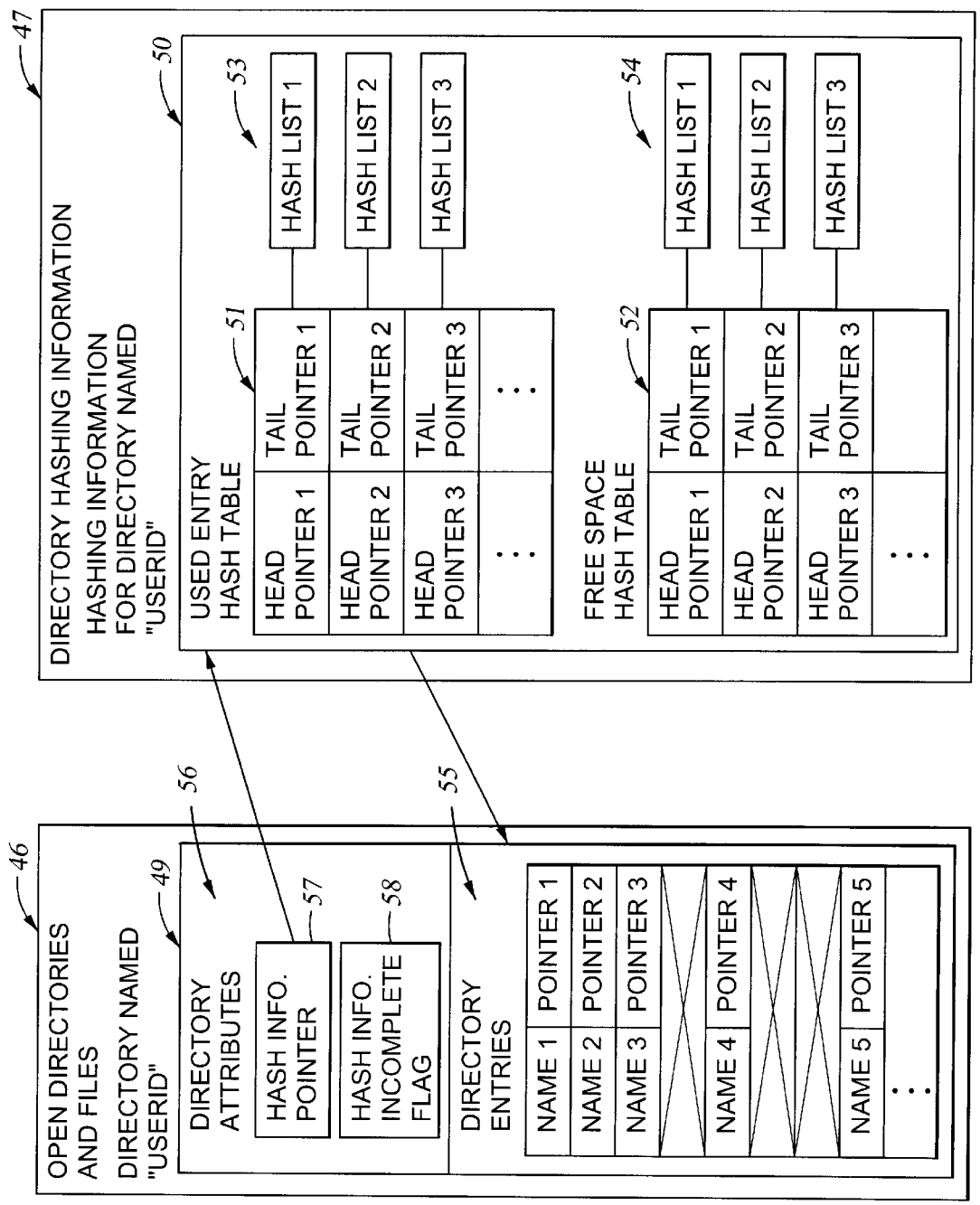
FIG. 3 is a block diagram showing in further detail the directory hashing information and a relationship between a directory and the directory hashing information.

FIG. 3 shows the preferred construction of the directory hashing information 47 and a large directory 49 named "USERID" associated with directory hashing information 50. It is desirable to create the directory hashing information only for certain identified files. In the example of FIG. 3, the directory hashing information 47 includes, for each directory having such information, a used entry hash table 51, and a free space hash table 52. Each hash table includes a selected number of entries. If an entry is not empty, then it includes a head pointer and a tail pointer to a respective hash list 53, 54 for the entry. If the head pointer region of the entry has a value of zero, then the entry is empty and its respective hash list is null.

The used entry hash table 51 is used to accelerate the search for a directory entry having a specified object name. The used entry hash table 51 is indexed by computing a hash function on the object (e.g., file, link or directory) names recorded in the directory entries 55 of the directory file 49. For example, the hash function computes the sum of all the codes for the characters in the name and then divides the sum by the number of entries in the used entry hash table 51 to obtain a remainder or modulus that is an index or key into the used entry hash table. The resulting hash key has the property that it lies within the range [0 . .n−1] where n is the number of entries in the used entry hash table.

The free space hash table 52 is used to accelerate compaction of a directory during a background task, and to permit holes in a directory to be filled up when objects are added to the directory. In either case, the free space hash table accelerates the search for holes in the directory, for either removing the space of the holes or filling in the holes.

The free space hash table is indexed by the amount of free space available from a directory entry. In other words, index 0 is used for recording all free spaces of size in the range [0–a), index 1 for range [a–b), index 2 for range [b–c) and so on. The values a, b, c, etc. are preselected based on criteria such as desire to balance the expected lengths of the hash lists, a desire to match the granularity of memory blocks that are dynamically allocated by the operating system, and a desire to simplify computations. The index value can be computed from a given free space size through a simple function or through a table lookup. A table lookup can be used in the general case. Specific values for a, b, c, etc. can be chosen to simplify computation using a function. For example, an index value of zero could correspond to one block of directory space, an index value of one could correspond to two blocks of directory space, an index value of two could correspond to four blocks of directory space, an index value of three could correspond to eight blocks of directory space, etc. In this case, the relationship between the index value and the number of blocks of directory space leads to a simple procedure for computing the index value from any given number of blocks of directory space. For example, the processor clears a first register, loads the free space amount into a second register, performs a logical right shift, tests if the result is zero, and if so terminates the procedure, otherwise increments the first register and loops back to the step of performing the logical right shift. The procedure returns the index value in the first register.

FIG. 3 further shows a logical representation of the directory entries 55 in the directory 49 named "USERID", as a table including a first column and a second column. The first column includes a list of names of objects, and the second column includes a list of pointers to data storage for the objects in the directory.

Figure 4:
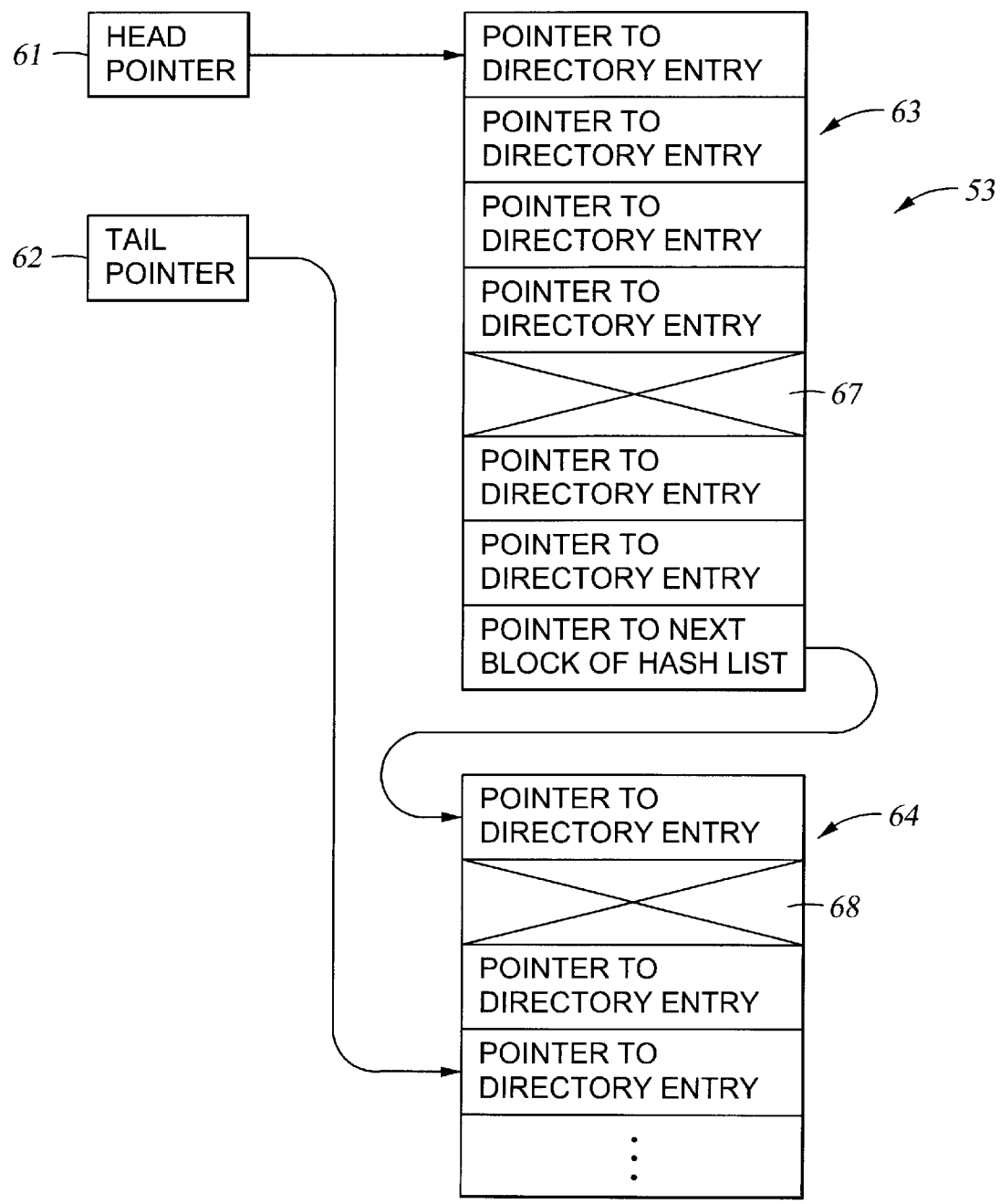
FIG. 4 is a block diagram showing a preferred construction for each hash list in the directory hashing information of FIG. 2.

FIG. 4 shows a preferred format for a hash list linked to a head-pointer 61 and a tail-pointer 62. The hash list includes a set of blocks, such as the set including a block generally designated 63 and a block generally designated 64. Each block includes a predetermined number of entries, and if the last entry in the block is not empty, then it points to a next block in the hash list. Except for the last entry of a block, an entry in the hash list is either zero (designated in the drawings as a crossed block) or is a pointer to one of the directory entries (55 in FIG. 3). A hash list entry is zero as a result of removing a pointer from the hash list.

Figure 5:
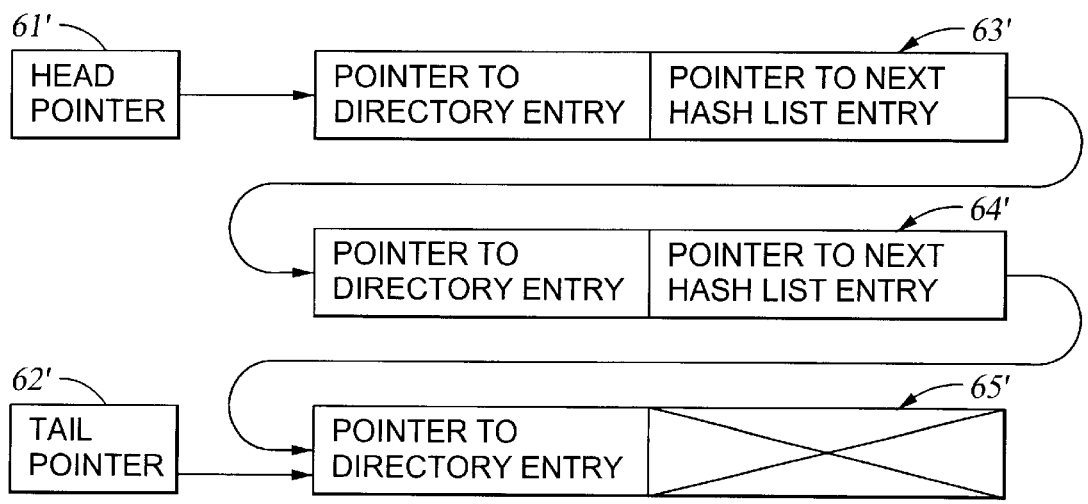
FIG. 5 shows an alternative construction for a hash list.

In lieu of the preferred format of FIG. 4, a conventional singly-linked hash list could be used as shown in FIG. 5. Such a singly-linked list includes a set of blocks 63', 64', 65', one block for each hash list entry. Each hash list entry includes a pointer to a respective directory entry, and except for the last entry in the list, a pointer to the next hash lists entry. The first hash list entry is indicated by a head pointer 61' and the last hash list entry is indicated by a tail pointer 62'. The format of FIG. 4 is preferred over the format of FIG. 5 for the usual case where the removal of hash list entries is rather infrequent. In such a situation, the hash list structure of FIG. 4 has a comparable search time yet has considerable savings in random access memory consumption. For example, the search time for the structure in FIG. 4 can be minimized by selecting a fixed block size to eliminate a need to test each hash list entry for the end of block condition. (Instead of adding blocks to store entries added to a hash list, the size of a block storing the hash list could be increased by allocating a new, larger block and copying the contents of the original block into the new larger block.) The following is a pseudo-code listing of a such a search routine operating upon a list of blocks, each having eight entries:

```
START   set list pointer to head pointer
E0      if hash list entry = 0 then go to E1
        search directory entry indicated by hash list entry
E1      if list pointer = tail pointer, then return unsuccessful
        if hash list entry = 0 then go to E2
        search directory entry indicated by hash list entry
E2      if list pointer = tail pointer, then return unsuccessful
        if hash list entry = 0 then go to E3
        search directory entry indicated by hash list entry
E3      if list pointer = tail pointer, then return unsuccessful
        if hash list entry = 0 then go to E4
        search directory entry indicated by hash list entry
E4      if list pointer = tail pointer, then return unsuccessful
        if hash list entry = 0 then go to E5
        search directory entry indicated by hash list entry
E5      if list pointer = tail pointer, then return unsuccessful
        if hash list entry = 0 then go to E6
        search directory entry indicated by hash list entry
E6      if list pointer = tail pointer, then return unsuccessful
        if hash list entry = 0 then go to E7
        search directory entry indicated by hash list entry
E7      if list pointer = tail pointer, then return unsuccessful
        Set list pointer = address of next block
        Go to E0
```

Returning to FIG. 3, it is advantageous, though not necessary, for each directory to have an attribute indicating whether or not respective hashing information is resident in the random access memory. For example, the directory attributes 56 include a hash information pointer 57. If the hash information pointer is zero, then there is no assurance that respective hashing information will be found in the random access memory. Otherwise, if the hash information is not zero, it will point to the hashing information for the directory.

Although the hashing information, if it is found in the random access memory, should be correct, it need not be complete. The hashing information may be incomplete in that each valid directory entry (i.e., a directory entry including a name of an object in the directory) may not have a corresponding pointer on the used entry hash table 51, and each directory entry having free space may not have an entry in the free space hash table 52. The hashing information for a directory need not be complete because the hashing information merely provides a hint as to where to search through the directory entries. If a search using incomplete hashing information is not successful, then a conventional linear search through the directory entries may be performed. However, if it is known that the hashing information is complete, then a search need not be performed any further than by searching the directory entries indicated by the hashing information. As shown in FIG. 3, the directory attributes 56 for the directory name "USERID" includes a hash information incomplete flag 58 that is a logical zero if the hashing information is complete and is a logical one if the hashing information is not necessarily complete.

Figure 6:
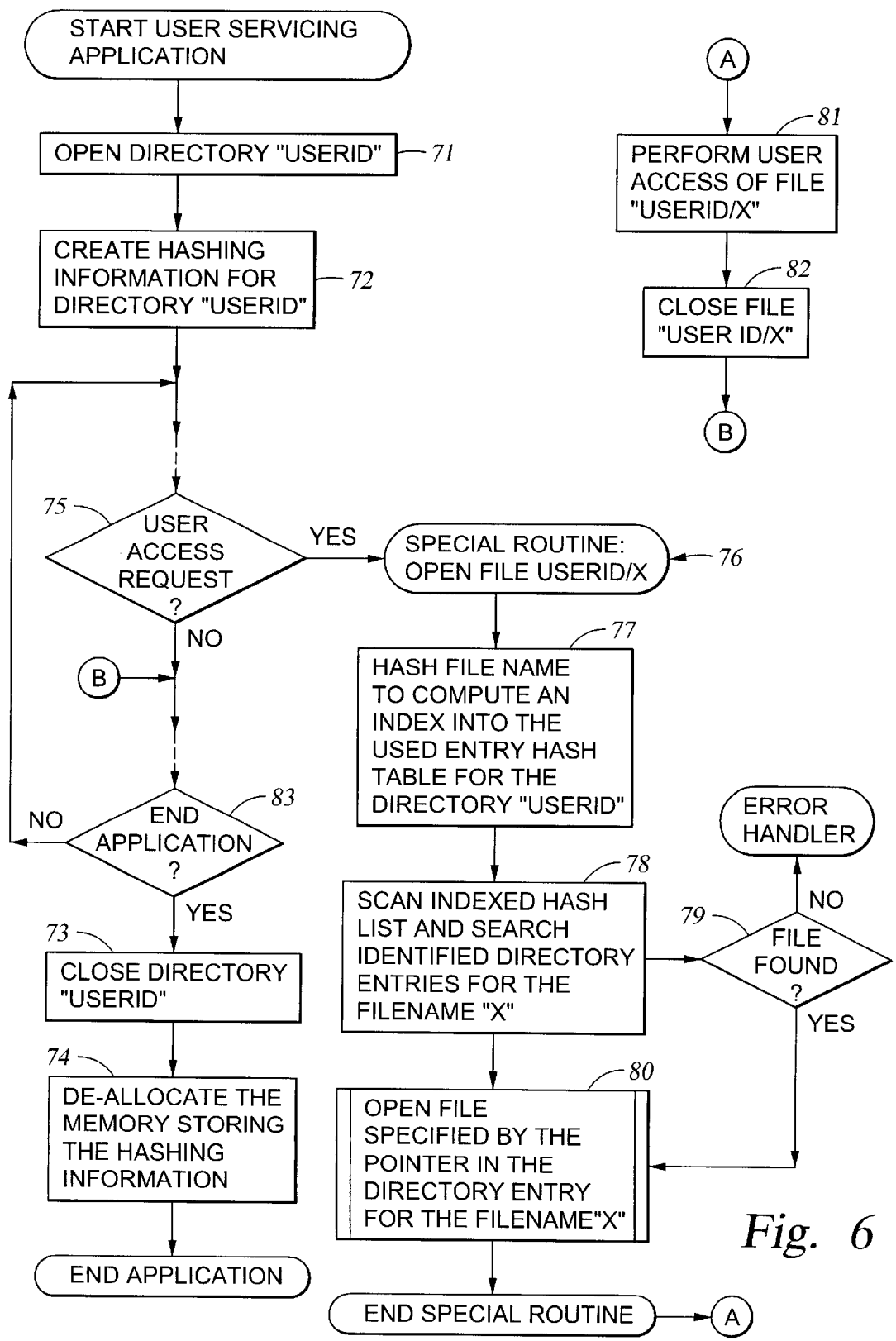
FIG. 6 is a flowchart of one example for software of the digital computer of FIG. 1, in which an application program is responsible for creating, using, and maintaining the directory hashing information.

Turning now to FIG. 6, there is shown a flowchart for an implementation of the system of FIG. 1 wherein the application program 43 is responsible for creating and maintaining the directory hashing information 47. Such an embodiment would be the easiest to implement although there would be some difficulty if other applications would have read-write access to the directory hashing information or the corresponding directory information. Any other applications having read-write access to the directory hashing information or the corresponding directory information would need to maintain consistency between the directory hashing information and the corresponding directory information. In general, this is done by using "locks" to preserve mutually exclusive access to the shared state of the directory hashing information and the corresponding directory information. In the example of FIG. 6, this coherence could be maintained simply by the application keeping a directory open for exclusive read-write access from the time that the application creates the directory hashing information to the time that the application de-allocates the directory hashing information from the random access memory.

In the program of FIG. 6, the directory hashing manager 48 would be integrated with the application program 43. For example, in a first step 71 of the application program, the processor (22 in FIG. 1) opens the directory "USERID". Then in step 72 the processor creates hashing information for the directory "USERID". At this point, the hashing information is available for use in searching the directory "USERID". The directory remains open for the application and the hashing information is resident in the random access memory until the end of the application when the directory is closed in step 73 and the memory storing the hashing information is de-allocated in step 74. For the interim, the directory "USERID" and the hashing information for this directory are private to the application program of FIG. 6

The application program of FIG. 6 uses the directory and the hashing information when responding to a user access request. For example, in step 75, upon receipt of a user access request, execution branches to a "special" open file routine beginning in step 76. By special, it is meant a routine like the one provided by a conventional file system manager, but one that provides an additional feature. The special routine opens a file named "X" in the directory "USERID", and has the additional feature of using hashing information for the directory "USERID" to accelerate the search for the file name "X" in the directory "USERID". In this example, the file name "X" is also a user identification number. In the special routine, in step 77, the processor hashes the file name to compute an index into the used entry hash table (51 in FIG. 3) for the directory "USERID". Next, in step 78, the indexed entry of the used entry hash table is inspected, and if it is not zero, then the respective hash list is scanned to search for directory entries for the file name "X". If the file named "X" is not in the directory, as tested in step 79, then execution would be transferred to an error handler. Otherwise, execution continues to step 80, and processor opens the file specified by the pointer in the directory entry for the file name "X". This completes the special routine for opening the file. The last step 80 of this special routine is a call to an entry point in a conventional file system manager (45 in FIG. 1). After the special routine, execution continues to step 81 to perform user access of the file "USERID/X". When the user access is finished, the processor closes the file in step 82. Execution then continues until step 83 is reached. In step 83, execution continues to step 73 to finish the application, or execution loops back to step 75 to service additional user access requests.

The example just described above with respect to FIG. 6 suffers the disadvantage that the directory and the hashing information for the directory become private to a particular application. This disadvantage can be eliminated by programming the operating system to generate, maintain, and use the hashing information for the benefit of any or all of the application programs. The operating system, though, must ensure that no attempt will be made to access hashing information until the hashing information is stored in the random access memory. This problem is not trivial, because the hashing information in the random access memory will be destroyed whenever the computer is shut-off. The alternative of backing up the hashing information in non-volatile storage is possible, but it is less desirable because it would introduce additional costs of the backup storage, processor time, programming complexity, and blocking of directory access due to the need for maintaining consistency between each directory and its associated hashing information. Moreover, it is desirable to generate the hashing information only for certain files, at a time before an application accesses the files.

Figure 7:
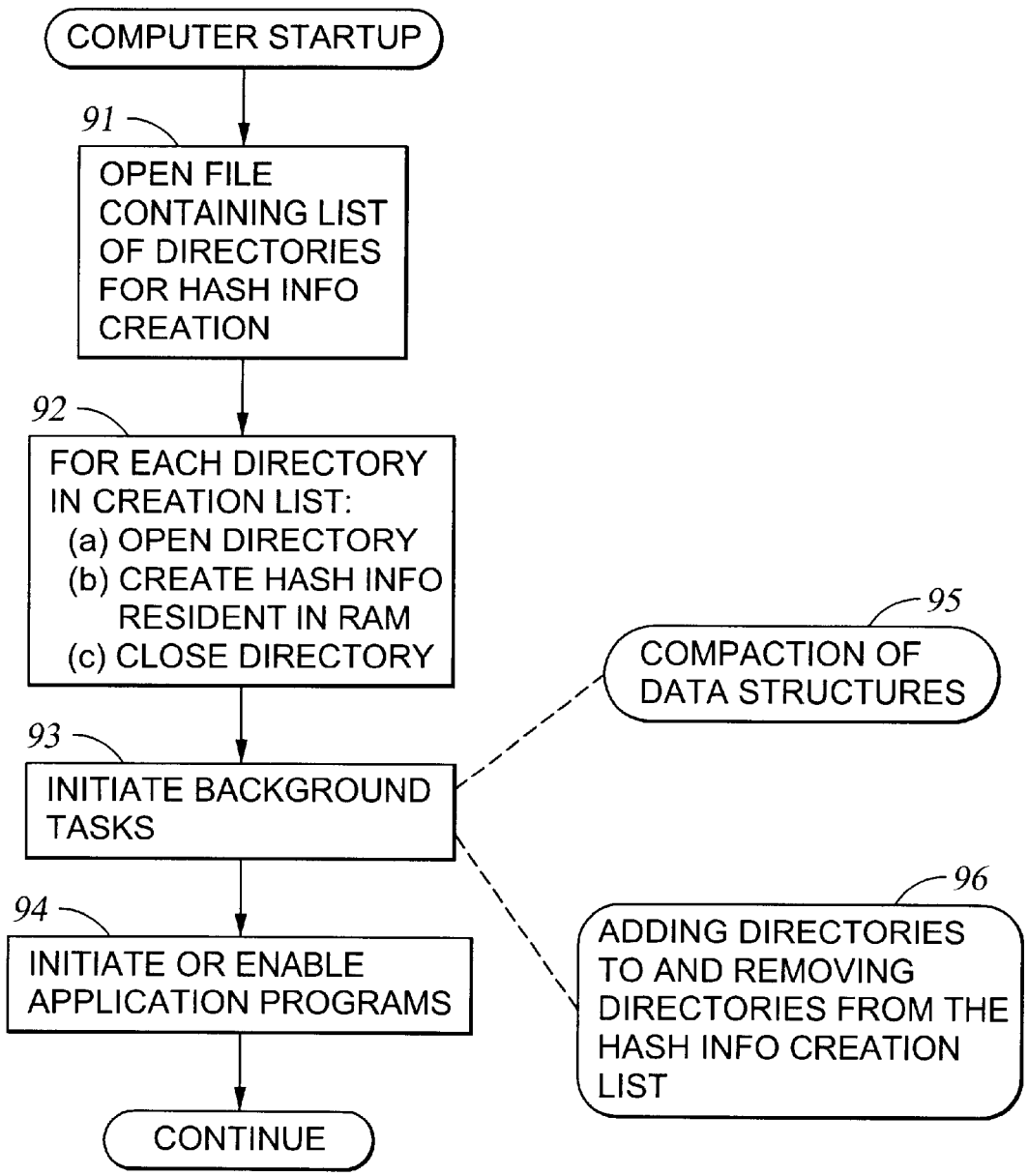
FIG. 7 is a flowchart of another example for software of the digital computer of FIG. 1, in which an operating system of the digital computer is responsible for creating, using and maintaining the directory hashing information.

One way of ensuring the desired conditions is for the operating system to maintain a file containing a list of directories for which hashing information should be generated and placed in the random access memory. For example, as shown in FIG. 7, during the start-up of the computer, the operating system in step 91 opens the file containing the list of directories for which hashing information should be generated. Then, in step 92, for each directory in this creation list, the processor opens the directory, then creates the hash information resident in the random access memory, and then closes the directory. Next, in step 93, the processor initiates a number of background tasks. For example, the background tasks included a task 95 of compacting various data structures, and a task 96 for adding directories to and removing directories from the hash information creation list. The compaction task 95, for example, compacts data structures such as the hash list 53 in FIG. 4 by moving directory entry pointers from the end of the hash list to the zero entries or holes (67, 68 in FIG. 4) in the list. Thus, the compaction task reduces the amount of memory consumed by the hash lists and also speeds up the search time by removing the holes in the hash list.

The task 96 of adding directories to and removing directories from the hash information creation list is further described below with reference to FIG. 11. In general, directories are added once the directories reach a large size, and they are removed when they shrink to a smaller size. In FIG. 7, after the operating system initiates the background tasks in step 93, the operating system initiates or enables application programs in step 94. The operating system may then continue various background tasks during the execution of application programs.

Figure 8:
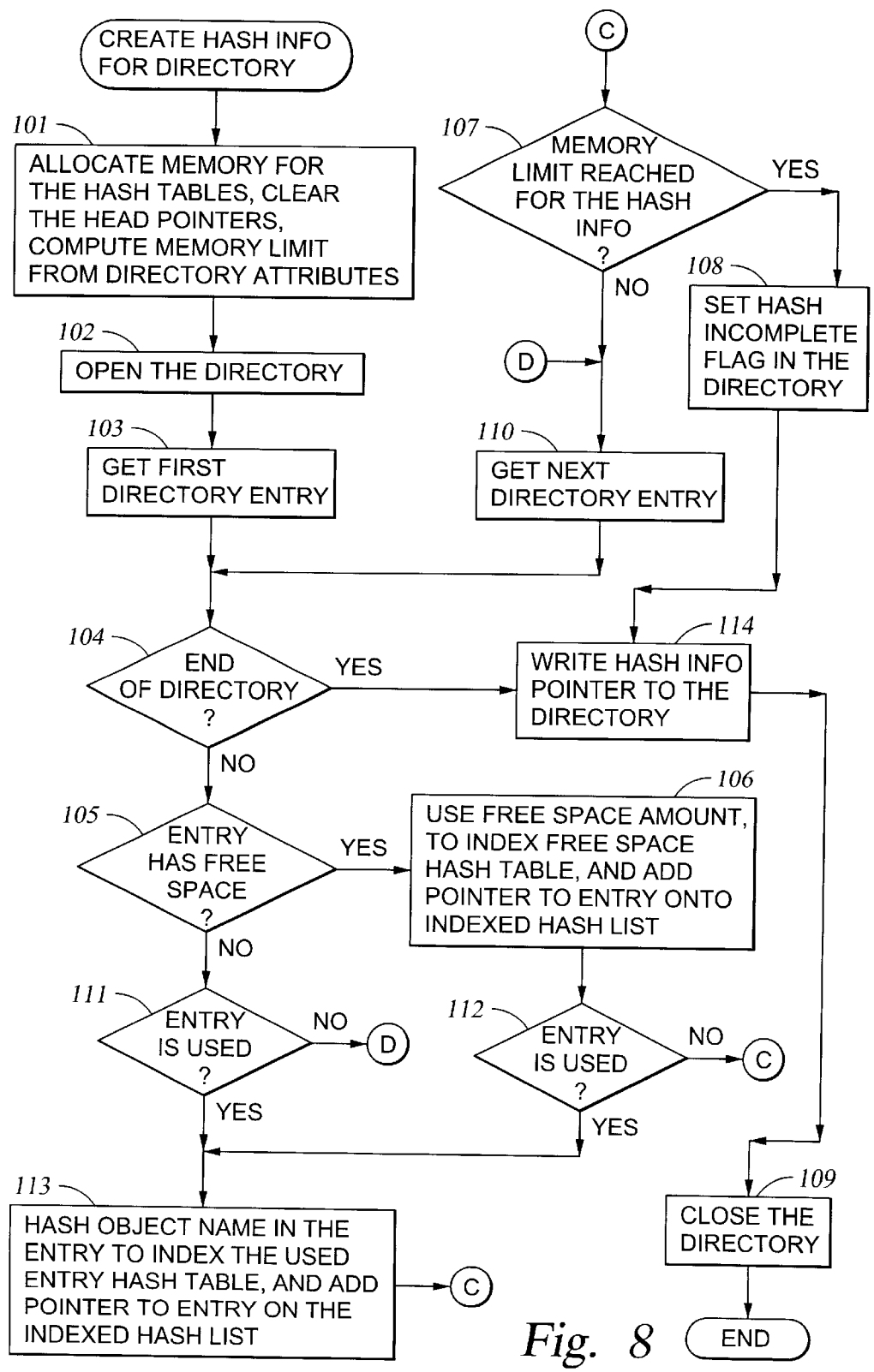
FIG. 8 is a flowchart of a routine for creating the directory hashing information.

FIG. 8 shows a flowchart for a routine that creates the hash information for a directory. In a first step 101, the processor allocates memory for the hash tables, clears the head pointers in the hash tables, and computes a memory limit from directory attributes. The memory limit, for example, is based on the present size of the directory, a specified priority of access to the directory or priority of users having access rights to the directory, and historical statistics such as the frequency of access for average user access time to the directory. Then, in step 102, the processor opens the directory, and in step 103 obtains the first directory entry. It is possible that the directory is initially empty in with case the end of the directory is reached immediately. Otherwise, if the end of the directory is not reached, then execution continues from step 104 to step 105. In step 105, the processor checks whether the directory entry has free memory space. If so, execution branches to step 106 to record an indication of the directory having the free space into the free space hash table (52 of FIG. 3). In step 106, the processor uses the free space amount to index the free space hash table. After computing the index value from the free space amount, the processor checks whether the head pointer is zero. If so, then the processor allocates a block for the hash lists and sets the head pointer and the tail pointer to the first entry in the block. In any case, once the head pointer is something other than zero, the processor loads a pointer to the directory entry into the location of the hash lists indicated by the tail pointer and then increments the tail pointer. If the tail pointer becomes incremented to the last entry in one of the blocks of the hash list, then another block for the hash list is allocated and linked to the end of the previous block of the hash list, and then the tail pointer is set to point to the first entry in this new block. In addition, a memory size attribute for the hash information for the directory is incremented by the amount of memory space added to the hash list. Execution then branches from step 106 to step 112. In step 112, execution branches to step 107 if the entry is not used for an object; i.e., the entry does not include a valid object name. In step 107 the processor checks whether the memory limit has been reached for the hash information for the directory. If so, then execution branches from step 107 to step 108. In step 108, the processor sets the hash incomplete flag in the directory, and execution continues to step 114 to write the hash information pointer to the directory. Then in step 109, the processor closes the directory and the routine is finished.

In step 107, if the memory limit has not been reached for the hash information then execution continues to step 110 to get the next directory entry. Execution then loops back to step 104.

In step 105, if the entry does not have free space, execution continues to step 111. In step 111, if the entry is not used (i.e., it does not have a valid name for an object), then execution branches to step 110 to continue processing with the next directory entry. (In a typical construction for the directory, a branch from step 111 to step 110 would not occur because if an entry does not have free space, as tested in step 105, then it would be a used entry. In such a construction, step 111 could be omitted, in which case execution would continue from step 105 to step 113 instead of step 111.) Execution continues from step 111 or step 112 to step 113 when the directory entry is used. In step 113, the processor hashes the object name from the directory entry to compute an index for the used entry hash table. A pointer to the directory entry is then placed on the indexed hash list, in a fashion similar to described above with respect to step 106. After step 113, execution continues to step 107.

Once the end of the directory is reached in step 104, execution continues to step 114, to write the hash information pointer to the directory, and then to close the directory in step 109 to finish the routine.

Figure 9:
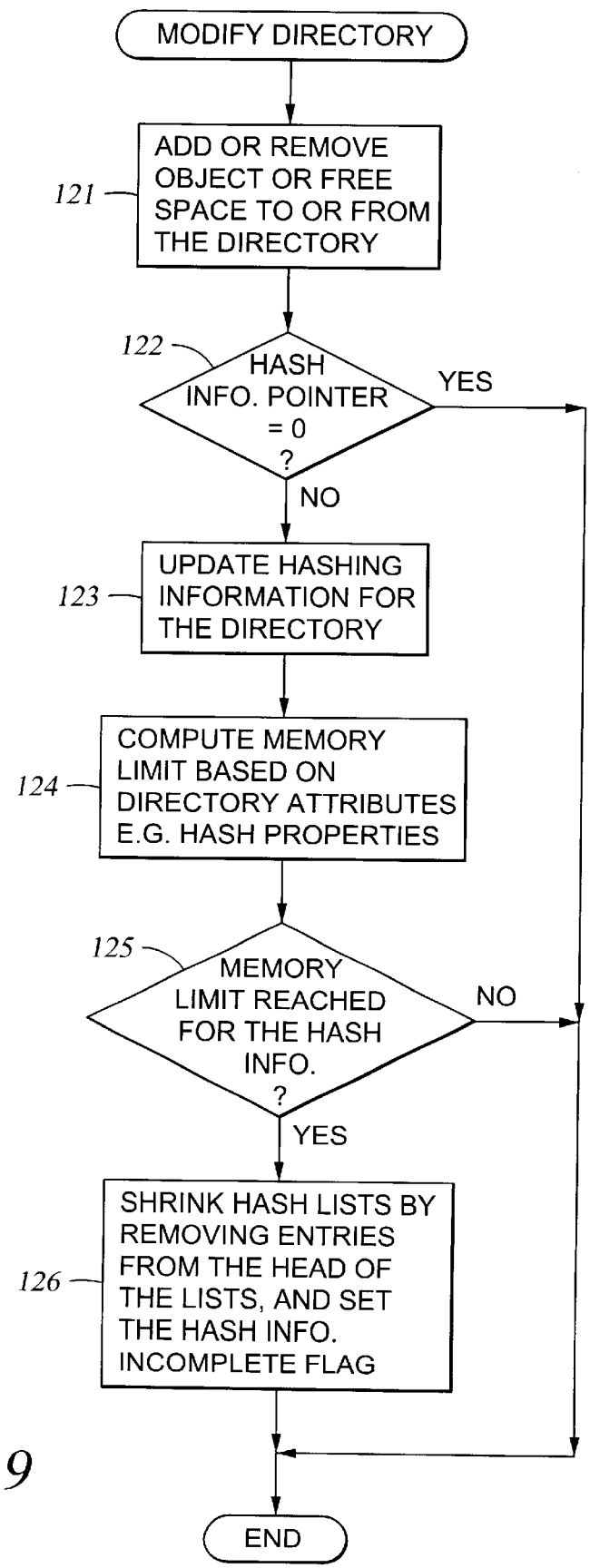
FIG. 9 is a flowchart of a routine for updating the directory hashing information when a directory is modified.

FIG. 9 shows a flowchart for updating the hashing information when a directory is modified. The directory is modified in step 121 by adding or removing an object or removing free space to or from the directory. Whenever such a modification would make any hashing information incorrect, then the routine for modifying the directory must include additional steps. For example, in step 122, the hash information pointer for the directory is compared to zero. If it is zero, then the routine is finished, because there is no hashing information to be considered for the directory. Otherwise, execution continues to step 123 to update the hashing information for the directory. It is also possible to permit the hashing information to grow or shrink whenever the directory is modified. For example, in step 124, the processor computes a new value of the memory limit based on the directory attributes including hash properties such as statistics that may have been collected since the hashing information was last generated and loaded into the random access memory. Then, in step 125, the processor checks whether the memory limit has been reached for the hashing information. If not, then the routine is finished. If so, execution continues to step 126 to shrink the hash lists and to set the hash information incomplete flag in the directory. The hash lists are shrunk, for example, by unlinking blocks of entries until the memory limit is satisfied. For example, first the hash lists are scanned to eliminate if possible one block from the head of each hash list until the memory limit is reached, and if this is not sufficient to reach the memory limit, the process is repeated until the memory limit is achieved. This will tend to form a cache of recently used hashing information. After step 126, the routine is finished.

Figure 10:
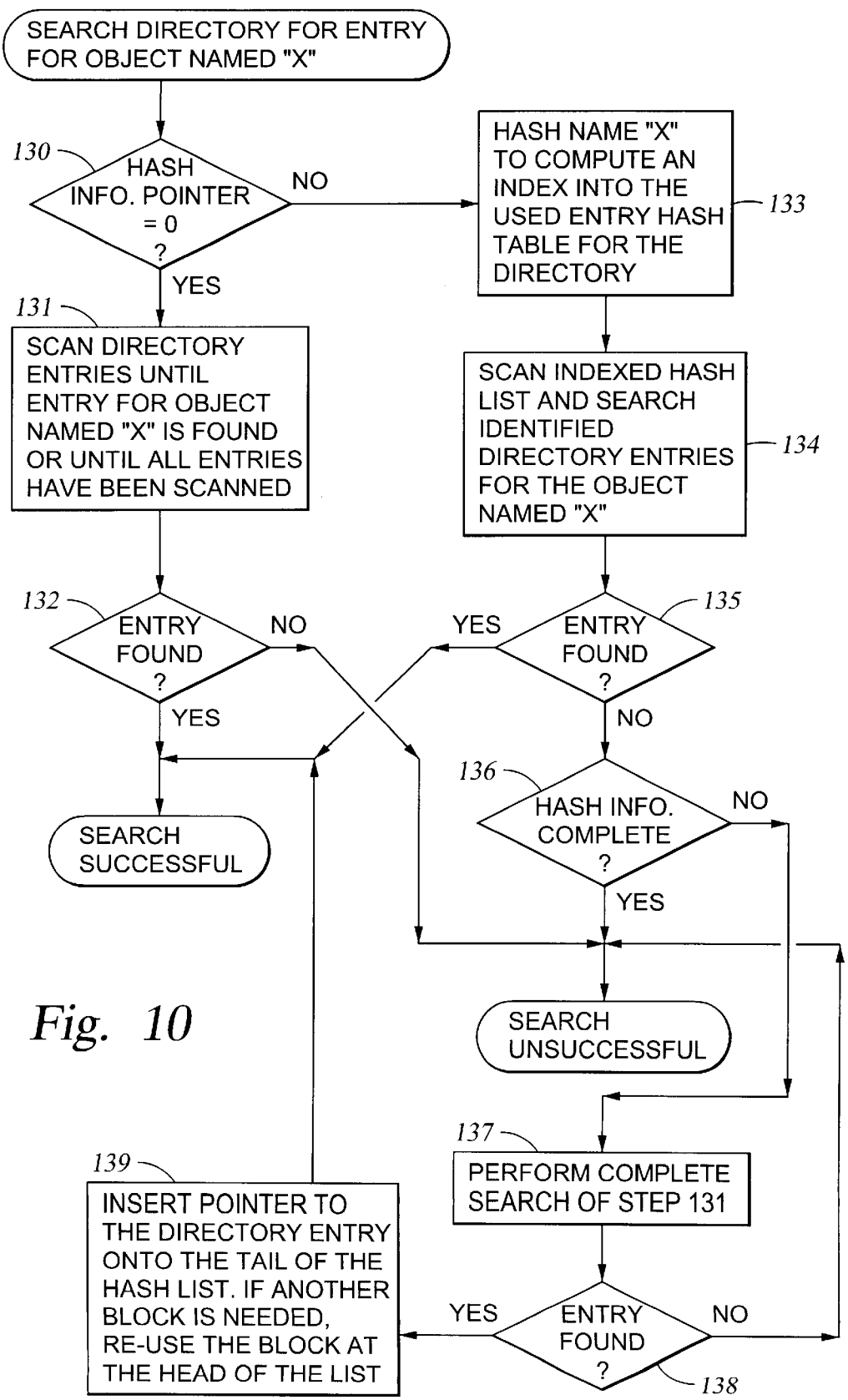
FIG. 10 is a flowchart of a file system manager routine for searching a directory for a specified object in the directory.

FIG. 10 shows an operating system routine for searching a directory for an entry including a specified object name "X" for the case where the directory hashing manager is integrated with the file system manager. In a first step 130, execution branches depending on whether the hash information pointer is equal to zero. If so, then the routine assumes that there is no hashing information in the random access memory, and execution continues to step 131. In step 131, the directory is searched in the conventional fashion. The directory entries are scanned until an entry including the object name "X" is found or until all entries have been scanned. Then in step 132 execution branches depending on whether an entry for the object has been found. If so, then execution returns indicating a successful search. Otherwise, execution returns indicating an unsuccessful search.

If in step 130 the hash information pointer is not zero, then the directory should have hashing information resident in the random access memory, and execution branches from step 130 to step 133. In step 133, the processor hashes the name "X" to compute an index into the used entry hash table for the directory. Then in step 134 the processor scans the indexed hash list and searches for the identified directory entries for the object name "X". If such an entry is found, as tested in step 135, execution returns indicating a successful search. If not, execution continues from step 135 to step 136. In step 136, the processor checks the hash information incomplete flag in the directory attributes. If the hash information incomplete flag is set, then the hash information is not complete and execution continues to step 137 to perform a complete search in the conventional fashion. Otherwise, if the hash information incomplete flag is not set, it is assumed that the hashing information is complete, and execution returns indicating that the search has been unsuccessful. After step 137, execution continues to step 138 to check whether the entry has been found. If not, execution returns with an indication that the search has been unsuccessful. Otherwise, execution continues to step 139 to insert a pointer to the directory entry that was found onto the tail of the indexed hash list. If an additional memory block is needed to do this, then the additional memory block is obtained by unlinking the block at the head of the list so that it becomes placed at the tail of the list. In this fashion, the pointers to the blocks in the hash lists for the case of a directory having incomplete hashing information will tend to point to recently accessed directory entries. After step 139, execution returns indicating that the search has been successful.

Figure 11:
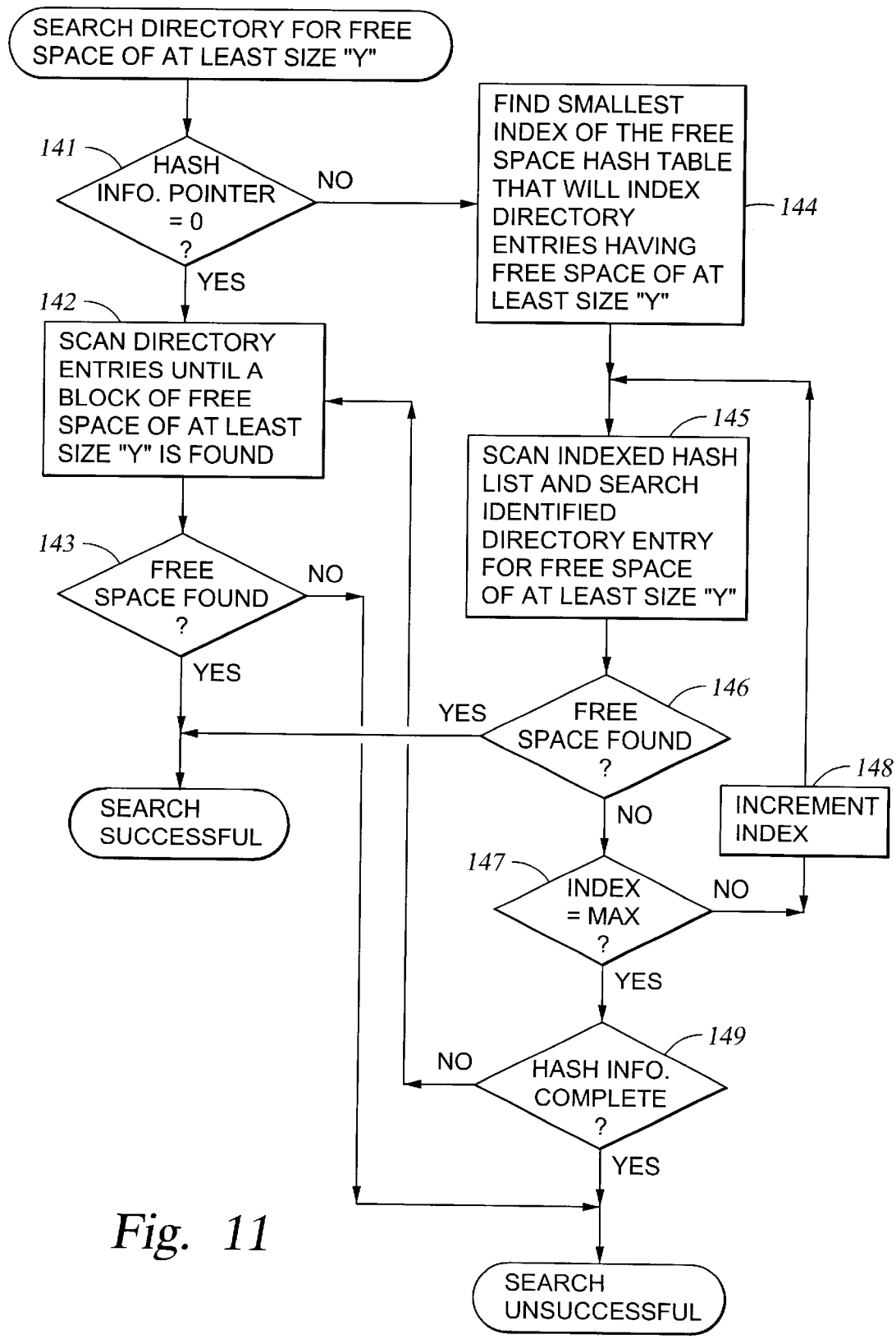
FIG. 11 is a flowchart of a file system manager routine for searching a directory for a specified amount of free space.

FIG. 11 shows a flow chart of an operating system routine for searching the directory for free space of at least size "Y". This routine is for the case where the directory-hashing manager is integrated with the file system manager in the operating system. In a first step 141, execution continues to step 142 if the hash information pointer is zero. In this case, the processor assumes that there is no hashing information for the directory. In step 142, the directory is searched in the conventional fashion for free space. In particular, the directory entries are scanned until an entry is found having a block of free space of at least size "Y". Execution then continues to step 143. Execution branches in step 143 depending on whether free space has been found. If free space has been found, then execution returns indicating that the search has been successful. Otherwise, execution returns indicating that the search has been unsuccessful.

If in step 141 the hash information pointer is not equal to zero, then the processor assumes that the directory has hashing information resident in the random access memory, and execution branches from step 141 to step 144 to find the smallest index of the free space hash table that will index directory entries having free space of at least size "Y". This index can be computed by a procedure or by testing limits in a table of the size limits for each hash index value. Then in step 145, the directory entries identified by the pointers in the indexed hash list are searched for free space of at least size "Y". If such free space is found, as tested in step 146, execution returns indicating a successful search result. If not, execution continues from step 146 to step 147. In step 147, the index is compared to the maximum index value. If the index is not equal to the maximum index value, then execution branches from step 147 to step 148. In step 148 the index is incremented, and execution loops back to step 145.

If in step 147 the index is equal to the maximum index value, then the search using the free space hash table has been exhausted. Execution continues to step 149 to check the hash information incomplete flag in the directory attributes. If the hash information incomplete flag is set, indicating that the hash information is not complete, then execution loops back to step 142 to perform a complete search by scanning the directory entries in the conventional fashion. Otherwise, if the hash information is complete, and execution returns from step 149 indicating that the search has been unsuccessful.

Figure 12:
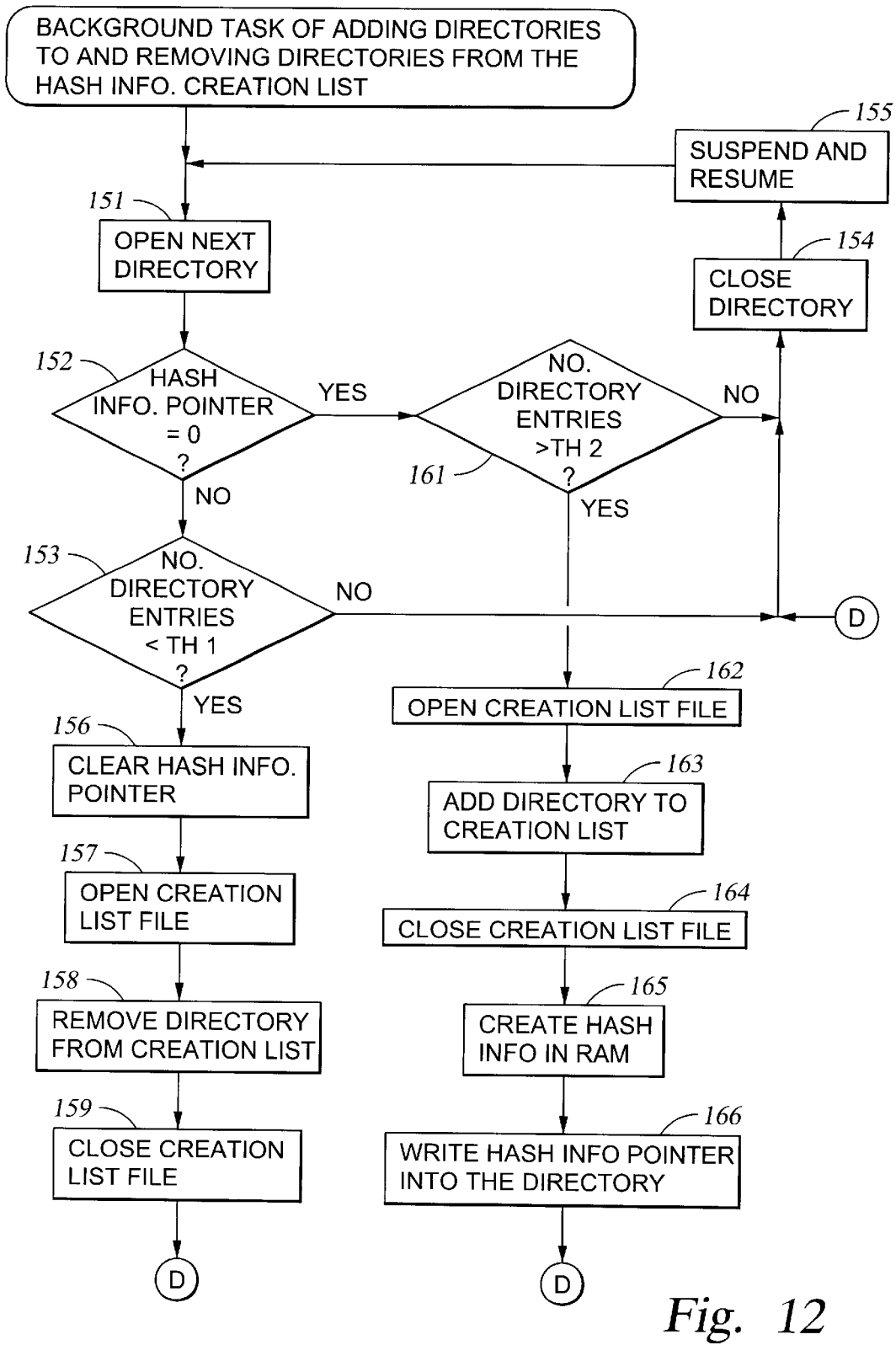
FIG. 12 is a flowchart of an operating system background task for adding or removing directories from a list of directories that should have respective directory hashing information resident in random access memory.

FIG. 12 shows a flow chart of the background task of adding directories to and removing directories from the hash information creation list. This routine scans all of the directories in a file system. In a first step 151, the processor opens the next directory. In 152, execution branches depending on whether the hash information pointer is zero for the directory. If not, execution continues to step 153. In step 153 the processor compares the number of directory entries to a low-threshold TH1. The threshold TH1 could be the same for all directories, or it could be different for different directories, e.g., smaller for directories accessed less frequently or having less need for rapid access, and larger for directories accessed more frequently or having a greater need for rapid access. If the number of directory entries is not less than the low threshold, then there is no need to remove the directory from the creation list, and therefore, execution continues to step 154 to close the directory. Then in step 155, the background task is temporarily suspended in favor of execution of any higher priority tasks, and then the background task of FIG. 12 is resumed. Execution loops from step 155 back to step 151.

If in step 153 the number of directory entries is less than the low threshold TH1, then execution continues to step 156. In step 156, the processor clears the hash information pointer. Then in step 157 the processor opens the creation list file. Then in step 158 the processor removes the directory from the creation list, and in step 159 the processor closes the creation list file. Execution continues from step 159 to step 154 to close the directory, and to continue the background task for other directories.

If the hash information pointer is equal to zero, as tested in step 152, execution branches from step 152 to step 161. In step 161, the number of entries in the directory is compared to a high-threshold TH2. The threshold TH2 could be same for all directories, or it could be different for different directories, e.g., smaller for directories accessed less frequently or having less need for rapid access, and larger for directories accessed more frequently or having a greater need for rapid access. If the number of directory entries does not exceed the high-threshold, then execution continues to step 154 to close the directory and to continue the background task. If the number of directory entries is greater than the high-threshold TH2, then execution branches from step 161 to step 162. In step 162, the processor opens the creation list file. Then in step 163, the processor adds the directory to the creation list, and in step 164 the processor closes the creation list file. In step 165 the processor creates the directory hashing information in the random access memory. Then in step 166, the processor writes the hashing information pointer into the directory. Execution continues from step 166 to step 154 to close the directory and to continue the background task.

Although the operations in FIG. 12 have been described in the context of a background task that scans all of the directories in a file system, steps 151 to 154 and 162 to 166 could be performed for a specified directory at the request of an application. In addition, steps 152 to 159 could be performed whenever the size of a directory is decreased, and steps 152 and 161 to 166 could be performed whenever the size of a directory is increased. For example, steps 153 to 159 could be inserted between steps 122 and 123 of FIG. 9 to be performed when the hash pointer is not zero, and steps 161 to 166 could be inserted between step 122 and the end of the routine in FIG. 9 to be performed when the hash pointer is zero. Moreover, it may be desirable for the hashing information creation process of steps 162 to 166 to be performed for a specified directory at the request of an application or upon the occurrence of a variety of other activation criterion such as first directory access, first directory lookup, or directory access frequency exceeding a threshold.

Figure 13:
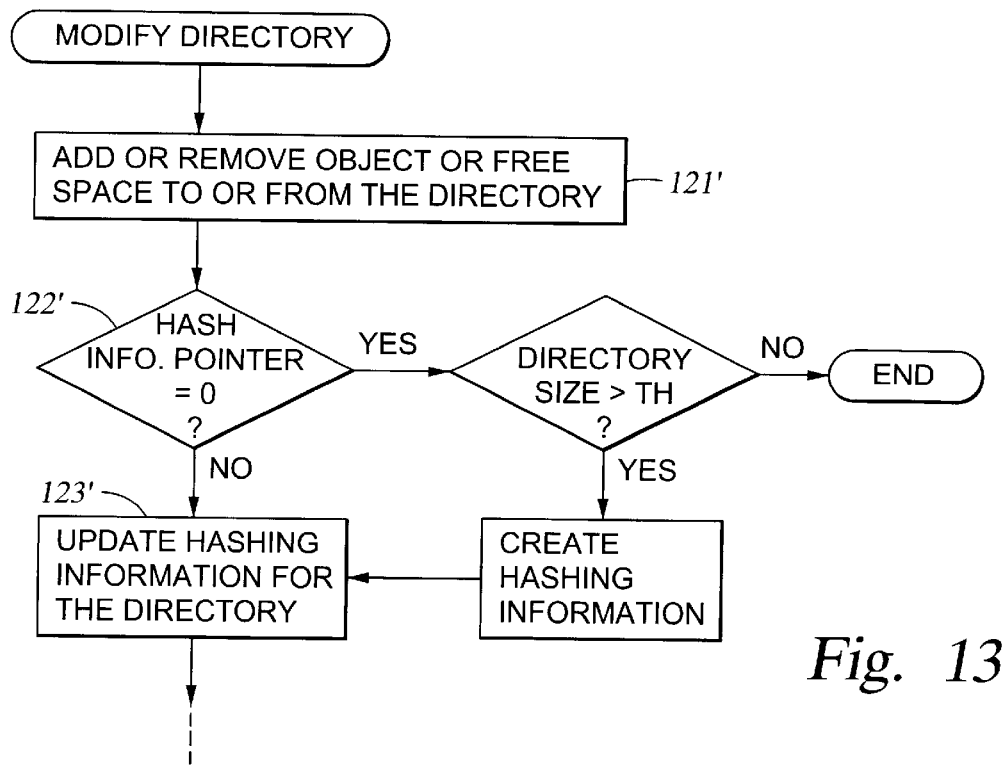
FIG. 13 shows a modified version of FIG. 9.
Figure 14:
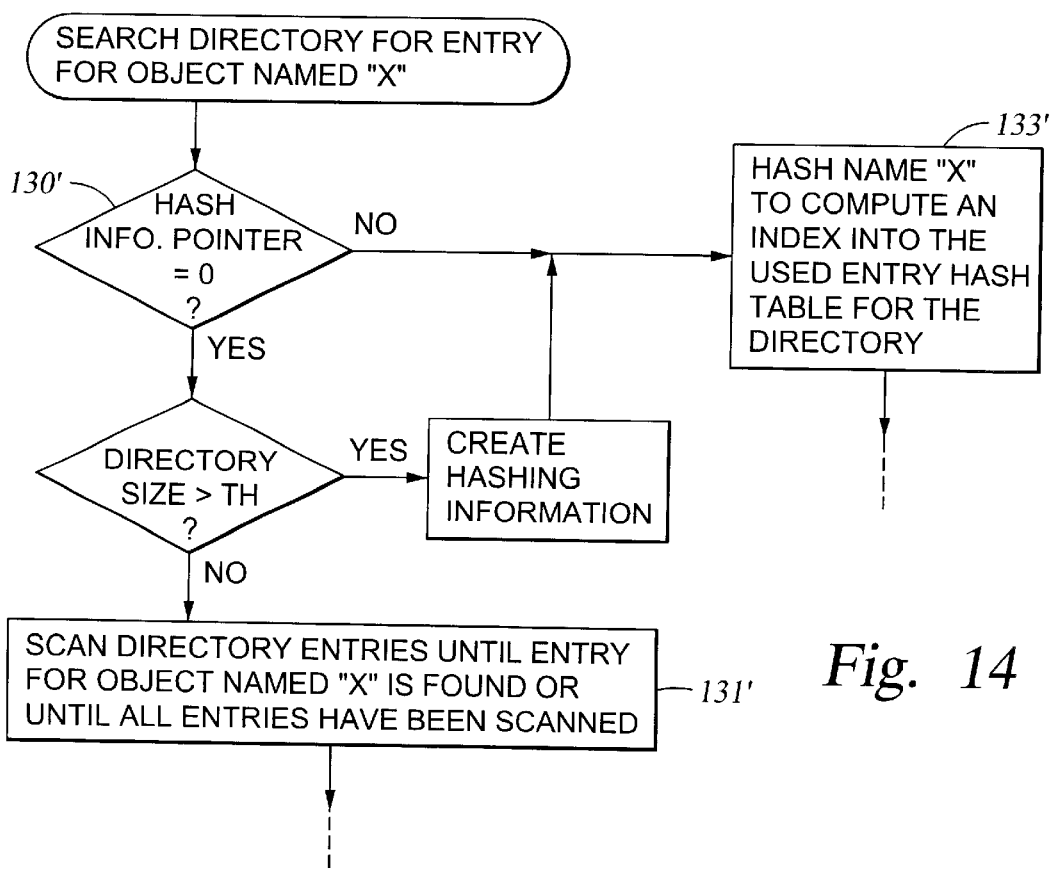
FIG. 14 shows a modified version of FIG. 10.

In an alternative embodiment, for example, the hash information creation process could be performed upon the first directory access or lookup by creating the hash info when the hash info pointer is found to be zero in step 122 of FIG. 9 or in step 130 of FIG. 10. In this alternative embodiment, after the hash info is created after step 122 of FIG. 9, execution would continue in step 123 of FIG. 9, and after the hash info is created after step 130 of FIG. 10, execution would continue in step 133 of FIG. 10. In this alternative embodiment, the creation of the hashing information could be conditioned on the size of the directory. For example, in FIG. 9, step 122, if the hash info pointer were zero and the directory size were not greater than a threshold, then execution could return instead of creating the hash information and continuing in step 123, and in FIG. 10, step 130, if the hash info pointer were zero and if the directory size were not greater than the threshold, then execution could continue in step 131 instead of creating the hashing information and continuing in step 133. These alternatives are illustrated in FIGS. 13 and 14, respectively, where similar steps are designated with similar but primed reference numerals.

In view of the above, there has been described various techniques for accelerating the searching of large file system directories. Hashing information for at least one selected directory is compiled and retained in random access memory prior to a need for access to the directory to satisfy a file access request from an application. No change in the on-disk file system representation is required, nor is there any need for nonvolatile storage of the hashing information. The organization of the directory as stored in the data storage may be compliant with a conventional industry standard for file systems, such as the UNIX file system (ufs), the System V file system (s5fs), or the Microsoft MS-DOS file system. If memory is scarce, the hashing information can be incomplete yet give hints for searching the most-recently-accessed directory entries. In a preferred implementation, the hashing information for a directory includes a hash table for searching for names of objects such as files, subdirectories or links in the directory, and a hash table for searching for free space in the directory. In one implementation, a selected directory and its hashing information is private to an application, which generates, uses, and maintains the hashing information. In another implementation, the hashing, information for selected directories is generated, maintained, and used by the operating system for the benefit of all applications. The operating system, for example, maintains a list of the selected directories in a file, and maintains in each directory an attribute pointing to any hashing information for the directory and a flag indicating whether the hashing information is incomplete.

It should be apparent that the examples shown in the drawings and described above can be modified and used in various ways. For example, depending on the particular file system manager and the use of the directories, it may be desirable to have additional hash tables for searching directory entries for things in addition to object names and free space. Moreover, the techniques may be adapted to digital computing systems having different levels of random access memory, such as very high-speed memory and lower speed memory. In this case it may be desirable to include an attribute in each directory to indicate whether the hashing information for each directory should be retained in the very high-speed memory or the lower speed memory. In systems using a cached disk array storage system, for example, the very high-speed memory could be the random access memory of the digital computer and the lower speed memory could be the cache memory of the cached disk array storage system. In this case, the retention of the hashing information in the cache of the cached disk array storage could use commands sent from the processor to the cached disk array for retaining or "pinning" the hashing information in the cache of the cached disk array storage system, rather than moving the hashing information down to disk storage when the hashing information is not frequently accessed. In a similar fashion, the digital computer may have a very high-speed cache of static random access semiconductor memory in addition to a large bank of dynamic random access memory, and it may desirable to have the capability for pinning the hashing information for certain directories in the very high-speed cache memory.

What is claimed is:

1. In a digital computing system having random access memory and data storage, in which an operating system program is executed to manage at least one file system in the data storage, the file system including at least one directory, a computer-implemented method comprising:
   a) accessing the directory and compiling and storing in the random access memory hashing information for searching the directory; and
   b) when a need arises for searching the directory, accessing the hashing information in the random access memory and using the hashing information for searching the directory;
   wherein the hashing information includes a hash table of free space indicated by entries of the directory, and the method includes indexing the hash table by hashing a specification of an amount of free space to be located in the directory.

2. In a digital computing system having random access memory and data storage, in which an operating system program is executed to manage at least one file system in the data storage, the file system including at least one directory, a computer-implemented method comprising:
   a) accessing the directory and compiling and storing in the random access memory hashing information for searching the directory; and
   b) when a need arises for searching the directory, accessing the hashing information in the random access memory and using the hashing information for searching the directory;
   which further includes storing in the directory an indication of whether the hashing information for the directory is either complete or incomplete.

3. The method as claimed in claim 2, wherein the using of the hashing information for searching the directory to satisfy the file access request includes searching only entries of the directory indicated by the hashing information, and when the searching of the directory to satisfy the file access request cannot be satisfied by only the entries of the directory indicated by the hashing information, then inspecting the indication of whether the hashing information for the directory is either complete or incomplete, and
   when the indication of whether the hashing information for the directory is either complete or incomplete indicates that the hashing information for the directory is incomplete, then searching other entries of the directory to satisfy the request; and when the indication of whether the hashing information for the directory is either complete or incomplete indicates that the hashing information for the directory is complete, then indicating that the searching of the directory to satisfy the file access request is unsuccessful without searching other entries of the directory to satisfy the request.

4. In a digital computing system having random access memory and data storage, in which an operating system program is executed to manage at least one file system in the data storage, the file system including at least one directory, a computer-implemented method comprising:

a) prior to any need for searching a directory for finding a specified file name in the directory, accessing the directory and compiling and storing in the random access memory hashing information for searching for file names in the directory; and b) when a need arises for searching the directory for finding a specified file name in the directory, accessing the hashing information in the random access memory and using the hashing information for searching the directory;

which includes the operating system performing a startup procedure in response to a reset or power-up, the startup procedure including opening a file including a list of directories, each of the directories including a plurality of file names, and compiling and storing in the random access memory hashing information for searching for the file names in each of the directories in the list of directories.

5. The method as claimed in claim 4, wherein the operating system enables applications to access the directory after the operating system has stored in the random access memory the hashing information for searching the directory.

6. The method as claimed in claim 4, wherein the method includes performing a background routine for changing the list of directories.

7. The method as claimed in claim 6, wherein the background routine scans the file system for attributes of the directories, and adds to the list directories that have a number of entries greater than a relatively high threshold, and removes from the list directories that have a number of entries less than a relatively low threshold, by comparing the number of entries in directories that are not on the list to the relatively high threshold, and comparing the number of entries in the directories that are on the list to the relatively low threshold.

8. The method as claimed in claim 7, wherein the threshold for each directory is based on an expected frequency of access to said each directory.

9. In a digital computing system having random access memory and data storage, in which an operating system program is executed to manage at least one file system in the data storage, the file system including at least one directory, a computer-implemented method comprising:

a) prior to any need for searching a directory for finding a specified file name in the directory, accessing the directory and compiling and storing in the random access memory hashing information for searching for file names in the directory; and b) when a need arises for searching the directory for finding a specified file name in the directory, accessing the hashing information in the random access memory and using the hashing information for searching the directory;

wherein the method includes performing a routine for searching for directories for which an accelerated search for file names would be desirable, and upon finding that an accelerated search for file names in at least one of the directories would be desirable, compiling and storing in the random access memory respective hashing information for searching for the file names in said at least one of the directories.

10. The method as claimed in claim 9, wherein the file system includes a plurality of directories, each of the directories has a number of entries, and wherein the method includes scanning the directories in the file system and selectively compiling and storing hashing information for selected ones of the directories, wherein the directories are selected based on the number of entries in each of the directories.

11. A program storage device containing a program for execution by a digital computing system having random access memory and data storage, in which an operating system program is executed to manage at least one file system in the data storage, the file system including at least one directory in the data storage, said program being executable for:

a) accessing the directory and compiling and storing in the random access memory hashing information for searching the directory; and b) when a need arises for searching the directory, accessing the hashing information in the random access memory and using the hashing information for searching the directory;

wherein the program is executable by the digital computer for creating the hashing information including a hash table of free space indicated by entries of the specified directory, and for searching the directory for free space by indexing the hash table with an index computed by hashing a specified amount of free space to be located in the directory.

12. A program storage device containing a program for execution by a digital computing system having random access memory and data storage, in which an operating system program is executed to manage at least one file system in the data storage, the file system including at least one directory in the data storage, said program being executable for:

a) accessing the directory and compiling and storing in the random access memory hashing information for searching the directory; and b) when a need arises for searching the directory, accessing the hashing information in the random access memory and using the hashing information for searching the directory;

wherein the program is executable for storing in the directory an indication of whether the hashing information for the specified directory is either complete or incomplete.

13. The program storage device as claimed in claim 12, wherein the program is executable for using the hashing information for searching the directory to satisfy the file access request by searching only entries of the directory indicated by the hashing information, and when the searching of the directory to satisfy the file access request cannot be satisfied by only the entries of the directory indicated by the hashing information, then inspecting the indication of whether the hashing information for the directory is either complete or incomplete, and when the indication of whether the hashing information for the directory is either complete or incomplete indicates that the hashing information for the directory is incomplete, then searching other entries of the directory to satisfy the request; and when the indication of whether the hashing information for the directory is either complete or incomplete indicates that the hashing information for the directory is complete, then indicating that the searching of the directory to satisfy the file access request is unsuccessful without searching other entries of the directory to satisfy the request.

14. A program storage device containing a program for execution by a digital computing system having random access memory and data storage, in which an operating system program is executed to manage at least one file system in the data storage, the file system including at least one directory in the data storage, said program being executable for:

a) prior to any need for searching a directory for finding a specified file name in the directory, accessing the directory and compiling and storing in the random access memory hashing information for searching for file names in the directory; and b) when a need arises for searching the directory for finding a specified file name in the directory, accessing the hashing information in the random access memory and using the hashing information for searching the directory;

wherein the program is executable for performing a startup procedure in response to a reset or power-up, the startup procedure including opening a file including a list of directories, each of the directories including a plurality of file names, and compiling and storing in the random access memory hashing information for searching for the file names in each of the directories in the list of directories.

15. The program storage device as claimed in claim 14, wherein the program is executable for enabling applications to access the file system after storing in the random access memory hashing information for searching each of the directories in the list of directories.

16. The program storage device as claimed in claim 14, wherein the program includes a background routine for changing the list of directories.

17. The program storage device as claimed in claim 16, wherein the background routine is executable for scanning the file system for attributes of the directories, and adding to the list directories that have a number of entries greater than a relatively high threshold, and removes from the list directories that have a number of entries less than a relatively low threshold, by comparing the number of entries in directories that are not on the list to the relatively high threshold, and comparing the number of entries in the directories that are on the list to the relatively low threshold.

18. The program storage device as claimed in claim 17, wherein the thresholds for each directory are based on an expected frequency of access to said each directory.

19. A program storage device containing a program for execution by a digital computing system having random access memory and data storage, in which an operating system program is executed to manage at least one file system in the data storage, the file system including at least one directory in the data storage, said program being executable for:

a) prior to any need for searching a directory for finding a specified file name in the directory, accessing the directory and compiling and storing in the random access memory hashing information for searching for file names in the directory; and b) when a need arises for searching the directory for finding a specified file name in the directory, accessing the hashing information in the random access memory and using the hashing information for searching the directory;

wherein the program includes a routine for searching for directories for which an accelerated search for file names is desirable, and upon finding that an accelerated search for file names in at least one of the directories would be desirable, compiling and storing in the random access memory respective hashing information for searching for the file names in said at least one of the directories.

20. The program storage device as claimed in claim 19, wherein the routine is executable for scanning the file system for attributes of the directories in the file system, and determining whether an accelerated search is desirable based on the attributes of the directories in the file system.

21. The program storage device as claimed in claim 20, wherein the attributes in each of the directories includes a number of entries in each of the directories, and wherein the program is executable for determining whether an accelerated search is desirable for said at least one of the directories by comparing the number of entries in said at least one of the directories to a threshold.

22. The program storage device as claimed in claim 21, wherein the threshold is based on an expected frequency of access to said at least one of the directories.

23. The program storage device as claimed in claim 19, wherein the program is executable for scanning directories in the file system and selectively compiling and storing hashing information for selected ones of the directories, each of the directories including a number of entries, wherein the directories are selected based on the number of entries in each of the directories.

24. In a digital computing system having random access memory and data storage, in which an operating system program is executed to manage at least one file system in the data storage, the file system including at least one directory, a computer-implemented method comprising:

a) prior to any need for searching a directory for finding a specified file name in the directory, accessing the directory and compiling and storing in the random access memory hashing information for searching for file names in the directory; and b) when a need arises for searching the directory for finding a specified file name in the directory, accessing the hashing information in the random access memory and using the hashing information for searching the directory;

which includes performing a startup procedure including opening a file including a list of directories, each of the directories including a plurality of file names, and compiling and storing in the random access memory hashing information for searching for the file names in each of the directories in the list of directories.

25. The method as claimed in claim 24, wherein the method includes performing a background routine for changing the list of directories.

26. The method as claimed in claim 25, wherein the background routine scans the file system for attributes of the directories, and adds to the list directories that have a number of entries greater than a relatively high threshold, and removes from the list directories that have a number of entries less than a relatively low threshold, by comparing the number of entries in directories that are not on the list to the relatively high threshold, and comparing the number of entries in the directories that are on the list to the relatively low threshold.

27. The method as claimed in claim 26, wherein the threshold for each directory is based on an expected frequency of access to said each directory.

* * * * *